United States Patent
Zhang et al.

(10) Patent No.: US 8,818,653 B2
(45) Date of Patent: *Aug. 26, 2014

(54) TRANSMISSION SHIFTING WITH SPEED DITHER AND TORQUE DITHER

(75) Inventors: Yisheng Zhang, Collierville, TN (US); John Loeffler, Olive Branch, MS (US)

(73) Assignee: Parker-Hannifin Corporation, Cleveland, OH (US)

( * ) Notice: Subject to any disclaimer, the term of this patent is extended or adjusted under 35 U.S.C. 154(b) by 163 days.

This patent is subject to a terminal disclaimer.

(21) Appl. No.: 13/611,139

(22) Filed: Sep. 12, 2012

(65) Prior Publication Data
US 2013/0000294 A1   Jan. 3, 2013

Related U.S. Application Data

(63) Continuation of application No. 12/268,100, filed on Nov. 10, 2008.

(60) Provisional application No. 60/986,303, filed on Nov. 8, 2007, provisional application No. 60/986,306, filed on Nov. 8, 2007.

(51) Int. Cl.
*G06F 7/00* (2006.01)

(52) U.S. Cl.
USPC ............ 701/51; 701/87; 701/22; 701/84; 701/54; 701/91; 477/155; 477/180; 477/181; 477/4; 477/5; 180/65.265; 180/65.31; 180/165; 180/248; 180/65.235

(58) Field of Classification Search
CPC .... B60W 10/06; F16H 61/47; F16H 61/4096; F16H 61/444

USPC ............ 701/51, 58, 84, 87, 22, 90, 91, 54; 477/68, 58, 46, 3, 5, 6, 8, 13, 15; 180/367, 165, 307, 308, 65.1

See application file for complete search history.

(56) References Cited

U.S. PATENT DOCUMENTS

| | | | |
|---|---|---|---|
| 3,580,107 A | 5/1971 | Orshansky, Jr. | |
| 4,026,251 A * | 5/1977 | Schweitzer et al. | 123/406.23 |
| 4,175,389 A | 11/1979 | Shiber | |

(Continued)

FOREIGN PATENT DOCUMENTS

| | | |
|---|---|---|
| EP | 0 805 061 | 11/1997 |
| EP | 0 857 895 | 8/1998 |

(Continued)

*Primary Examiner* — Redhwan K Mawari
(74) *Attorney, Agent, or Firm* — Renner, Otto, Boisselle & Sklar LLP

(57) ABSTRACT

A system and method of dithering speed and/or torque for shifting a transmission of a vehicle having an engine, a reversible, variable displacement hydraulic motor/pump which can be driven by the engine, a hydraulic accumulator supplied by said motor/pump, and at least one reversible hydraulic driving motor for propelling the vehicle supplied with fluid by the hydraulic accumulator and/or by said motor/pump operating as a pump. A transmission unit connects the engine with the variable displacement hydraulic motor/pump during a first mode of operation (city mode) and connects the engine to a vehicle drive wheel during a second mode of operation. The system utilizes stored hydraulic energy to dither the output of the driving motor in order to achieve quick and smooth shifts between city and highway mode, or between various ranges within the city mode.

20 Claims, 8 Drawing Sheets

(56) References Cited

U.S. PATENT DOCUMENTS

| | | | |
|---|---|---|---|
| 4,196,586 A | 4/1980 | Shiber | |
| 4,242,922 A * | 1/1981 | Baudoin | 477/68 |
| 4,341,131 A | 7/1982 | Pollman | |
| 4,800,779 A | 1/1989 | Parker | |
| 4,850,236 A | 7/1989 | Braun | |
| 5,002,020 A | 3/1991 | Kos | |
| 5,014,809 A | 5/1991 | Matsuda | |
| 5,163,530 A | 11/1992 | Nakamura et al. | |
| 5,193,416 A * | 3/1993 | Kanayama | 74/733.1 |
| 5,384,526 A * | 1/1995 | Bennett | 318/610 |
| 5,418,725 A | 5/1995 | Eto | |
| 5,508,916 A | 4/1996 | Markyvech et al. | |
| 5,616,091 A | 4/1997 | Warren | |
| 5,676,111 A | 10/1997 | Zhang | |
| 5,682,790 A | 11/1997 | Genise | |
| 5,797,110 A | 8/1998 | Braun et al. | |
| 5,847,470 A | 12/1998 | Mitchell | |
| 5,894,758 A | 4/1999 | Walker | |
| 5,904,068 A | 5/1999 | Genise | |
| 5,980,424 A | 11/1999 | Huber et al. | |
| 6,033,332 A | 3/2000 | Evans | |
| 6,224,511 B1 | 5/2001 | Steeby | |
| 6,278,915 B1 * | 8/2001 | Deguchi et al. | 701/22 |
| 6,319,171 B1 | 11/2001 | Hughes et al. | |
| 6,352,492 B1 | 3/2002 | Steeby et al. | |
| 6,371,882 B1 | 4/2002 | Casey et al. | |
| 6,554,742 B2 | 4/2003 | Milender et al. | |
| 6,773,368 B1 | 8/2004 | Williames | |
| 6,962,551 B1 | 11/2005 | Genise et al. | |
| 7,032,730 B2 | 4/2006 | Hardtle | |
| 7,048,671 B2 | 5/2006 | Morisawa et al. | |
| 7,104,347 B2 | 9/2006 | Severinsky et al. | |
| 7,234,366 B2 | 6/2007 | Hou | |
| 2005/0241437 A1 * | 11/2005 | Gray et al. | 74/730.1 |
| 2006/0118346 A1 | 6/2006 | Rampen et al. | |
| 2009/0124456 A1 * | 5/2009 | Zhang et al. | 477/68 |
| 2013/0000294 A1 * | 1/2013 | Zhang et al. | 60/327 |

FOREIGN PATENT DOCUMENTS

| | | |
|---|---|---|
| EP | 0 928 715 | 7/1999 |
| EP | 1 082 556 | 3/2001 |
| EP | 0 975 480 | 2/2002 |
| EP | 1 235 005 | 8/2002 |
| JP | 06-107017 | 4/1994 |
| JP | 2005-083457 | 3/2005 |
| JP | 2005-295603 | 10/2005 |
| JP | 2007-118717 | 5/2007 |

\* cited by examiner

Hydro Low

Braking/Charge Accum

TRANSMISSION SHIFTING WITH SPEED DITHER AND TORQUE DITHER

RELATED APPLICATIONS

This application is a continuation of U.S. patent application Ser. No. 12/268,100 filed Nov. 10, 2008, which claims the benefit of U.S. Provisional Application No. 60/986,303 filed Nov. 8, 2007, and U.S. Provisional Application No. 60/986,306 filed Nov. 8, 2007, all of which are hereby incorporated herein by reference.

FIELD OF THE INVENTION

The present invention relates generally to a transmission for series hydraulic hybrid vehicles in which the transmission shifting utilizes speed and/or torque dither.

BACKGROUND OF THE INVENTION

Vehicle transmissions are well known and include automatic, manual and semi-automatic types. A trend in the industry has been to make vehicles more efficient to reduce operation costs and pollution. Accordingly, hybrid vehicles having two separate power sources have become increasingly popular. A typical hybrid includes an internal combustion engine as one of its power sources, while the second power source may be an electric motor or hydrostatic transmission system. In either arrangement, the primary and secondary power sources are typically connected to the vehicles drivetrain, each being capable of providing power to the wheels of the vehicle either separately or in tandem.

One type of hybrid vehicle system includes an internal combustion engine, a reversible, variable displacement hydraulic motor/pump which can be driven by the internal combustion engine, an energy accumulator supplied by said motor/pump, and at least one reversible hydraulic driving motor for propelling the vehicle that is supplied by the hydraulic accumulator and/or by said motor/pump operating as a pump and being driven by the engine. A transmission unit connects the engine with the reversible, variable displacement hydraulic motor/pump during a first mode of operation (city mode) and connects the engine to the vehicle drive wheel during a second mode of operation (highway mode).

In a city driving mode, the hydraulic accumulator is recharged intermittently and automatically by the reversible hydraulic motor/pump operating as a pump driven by the engine.

Between two charging stages, the internal combustion engine can be shut down to conserve fuel. When the pressure of the accumulator falls below a set value, the engine is started by the hydraulic motor/pump operating as a motor that is supplied pressurized fluid from the accumulator. The use of such accumulators and reversible hydraulic, variable displacement motor/pumps in hybrid vehicles is well known in the art. See, for example, U.S. Pat. No. 4,242,922.

When the driver of the vehicle depresses the accelerator pedal, the accumulator discharges into the reversible hydraulic driving motor or motors operating as such as to propel the vehicle. When the driver applies the vehicle brakes, the reversible hydraulic motor or motors operate as a pump run by the rotation of the moving vehicles wheels and, therefore, serve to recover part of the kinetic or potential energy of the moving vehicle in order to recharge the accumulator.

For highway driving conditions, a second mode of operation may be selected wherein the transmission connects the engine to the vehicle drive wheels and the engine continuously drives the transmission in a conventional manner. In this mode, the reversible hydraulic motor/pumps are stopped.

Such systems provide reduced fuel consumption, noise and atmospheric pollution under city traffic conditions as a result of energy recovery during brake application and as a result of intermittent operation of the engine. In addition, in low speed range of city mode the driver uses only an accelerator and a brake without the need to shift gears since the variable displacement hydraulic motor/pump provides continuously variable power transmission. Finally, the fuel consumption of the vehicle on highways corresponds to that of a conventional vehicle since the engine is coupled to the drive wheels in a conventional manner.

Shifting the transmission from the city mode to the highway mode typically involves decoupling the engine from the reversible variable displacement pump/motor and coupling the motor directly to the drive wheels. Conversely, shifting from highway mode to city mode typically involves decoupling the engine from the drive wheels and coupling the engine to the reversible variable displacement pump/motor.

A smooth transition between city and highway modes and different gear ratios within city mode is often sought so as to minimize jolting transmission components and to provide a more comfortable ride for the occupants of the vehicle. Torque dithering of the engine output during shifting has been used in the past to achieve smoother shifting. Torque dithering generally includes varying the torque output of the motor about a desired torque value so as to avoid issues such as gear tooth butting and/or jerky shifts. For example, it is known to modulate the torque output of an engine by controlling its fuel supply to achieve a desired torque output.

SUMMARY OF THE INVENTION

A system and method of dithering is provided that offers quicker, smoother shifts, and can increase efficiency. The system utilizes stored hydraulic energy to dither the output of a variable reversible pump/motor unit in order to achieve quick and smooth shifts between city and highway mode, or between various ranges within the city mode.

Accordingly, a method of engaging a transmission of a series hydraulic hybrid system having at least one pump/motor selectively connectable to an output drive shaft of the transmission comprises the steps of calculating a desired speed of an output shaft of the at least one pump/motor, operating the at least one pump/motor at a target speed that is the desired output shaft speed plus a desired speed dither, and engaging the output shaft of the pump/motor with the output shaft of the transmission when the target speed is reached within a prescribed speed error threshhold. The operating step includes regulating the flow of fluid to and from an accumulator to the pump/motor to achieve the target speed. The engaging the transmission can include engaging a gear associated with the output shaft of the motor with a gear associated with the output drive shaft of the transmission. The calculating can include measuring the output drive shaft speed of the transmission.

The method may further comprise the steps of (i) selecting a gear from a plurality of different ratio gears associated with the output shaft of the pump/motor, and engaging the selected gear with a gear associated with the output drive shaft of the transmission, (ii) selecting a gear ratio corresponding to a first gear set of a plurality of gear sets having different ratios associated with the output shaft of the pump/motor, and engaging a clutch associated with the output drive shaft of the transmission to thereby engage the output shaft of the pump/motor with the output drive shaft of the transmission with the selected gear ratio, and/or (iii) engaging the output shaft of the pump/motor to the output drive shaft of the transmission.

The disengaging can include calculating a desired torque of the output shaft of the at least one pump/motor, operating the at least one pump/motor at a target torque that is the desired torque plus a desired torque dither, and disengaging the output shaft of the at least one pump/motor with the output shaft of the transmission when the target torque is commanded. The operating can include regulating the flow of fluid to and from an accumulator to the pump/motor to achieve the target torque.

According to another aspect, a method of disengaging a transmission of a series hydraulic hybrid system having at least one pump/motor selectively connectable to an output drive shaft of the transmission, comprises calculating a desired torque of an output shaft of the at least one pump/motor, operating the at least one pump/motor at a target torque that is the desired torque plus a desired torque dither, and disengaging the output shaft of the pump/motor with the output shaft of the transmission when the target torque is commanded. The operating can include regulating the flow of fluid to and from an accumulator to the pump/motor to achieve the target torque. The disengaging the output shaft of the pump/motor from the output drive shaft can include disengaging a gear associated with the output shaft of the motor with the output drive shaft of the transmission, and the calculating can include measuring the torque of the output drive shaft of the transmission.

According to another aspect, a hybrid transmission system for a vehicle comprises a primary hydraulic pump/motor, a secondary hydraulic pump/motor connected to the primary hydraulic pump/motor via a high pressure manifold, and an accumulator for storing pressurized fluid connected to both the primary and secondary pump/motors via the high pressure manifold. The transmission has an input shaft for receiving power from a prime mover, an output drive shaft for providing power to a drive element of the vehicle, power transmission components for selectively coupling the input shaft to at least one of the primary hydraulic pump and the output drive shaft, and for selectively coupling the secondary hydraulic pump/motor to the output drive shaft, and a controller for calculating a desired speed of an output shaft of the secondary pump/motor, operating the secondary pump/motor at a target speed that is the desired speed plus a desired speed dither, and engaging the output shaft of the secondary pump/motor with the output drive shaft of the transmission when the target speed is reached within a prescribed speed error threshold, and wherein the controller controls the high pressure manifold to supply fluid from the accumulator to the secondary pump/motor for operating the secondary pump/motor at the target speed.

The power transmission components can include a plurality of gear sets associated with the output shaft of the secondary pump/motor, each of the gear sets having a different gear ratio and being separately couplable to the output drive shaft of the transmission via a clutch. The clutch can be operable to either engage a gear set of the plurality of gear sets to couple the output shaft of the pump/motor with the output drive shaft of the transmission, or to disengage the output shaft of the pump motor from the output drive shaft. The transmission can be included in a vehicle having a prime mover, and at least one drive element coupled to the output drive shaft of the transmission for propelling the vehicle. The drive element can include a wheel, and the prime mover can include an internal combustion engine.

According to another aspect, a hybrid transmission system for a vehicle comprises a primary hydraulic pump/motor, a secondary hydraulic pump/motor connected to the primary hydraulic pump/motor via a high pressure manifold; and an accumulator for storing pressurized fluid connected to both the primary and secondary pump/motors via the high pressure manifold. The transmission has an input shaft for receiving power from a prime mover, an output drive shaft, power transmission components for selectively coupling the input shaft to at least one of the primary hydraulic pump and the output drive shaft and for selectively coupling the secondary hydraulic pump/motor to the output drive shaft, and a controller for calculating a desired torque of an output shaft of the secondary pump/motor, operating the secondary pump/motor at a target torque that is the desired torque plus a desired torque dither, and disengaging the output shaft of the secondary pump/motor from the output drive shaft of the transmission when the target torque is commanded. The controller regulates the high pressure manifold to supply fluid to and from an accumulator to the pump/motor to achieve the target torque.

The power transmission components can include a plurality of gear sets associated with the output shaft of the secondary pump/motor, each of the gear sets having a different gear ratio and being separately couplable to the output drive shaft of the transmission via a clutch. The clutch can be operable to either engage a gear set of the plurality of gear sets to couple the output shaft of the pump/motor with the output drive shaft of the transmission, or to disengage the output shaft of the pump motor from the output drive shaft. A vehicle including the hybrid transmission and a prime mover is provided, with the prime mover coupled to the input shaft of the transmission. The vehicle can include at least one drive element coupled to the output drive shaft of the transmission for propelling the vehicle.

Further features of the invention will become apparent from the following detailed description when considered in conjunction with the drawings.

DETAILED DESCRIPTION

Figure 1:
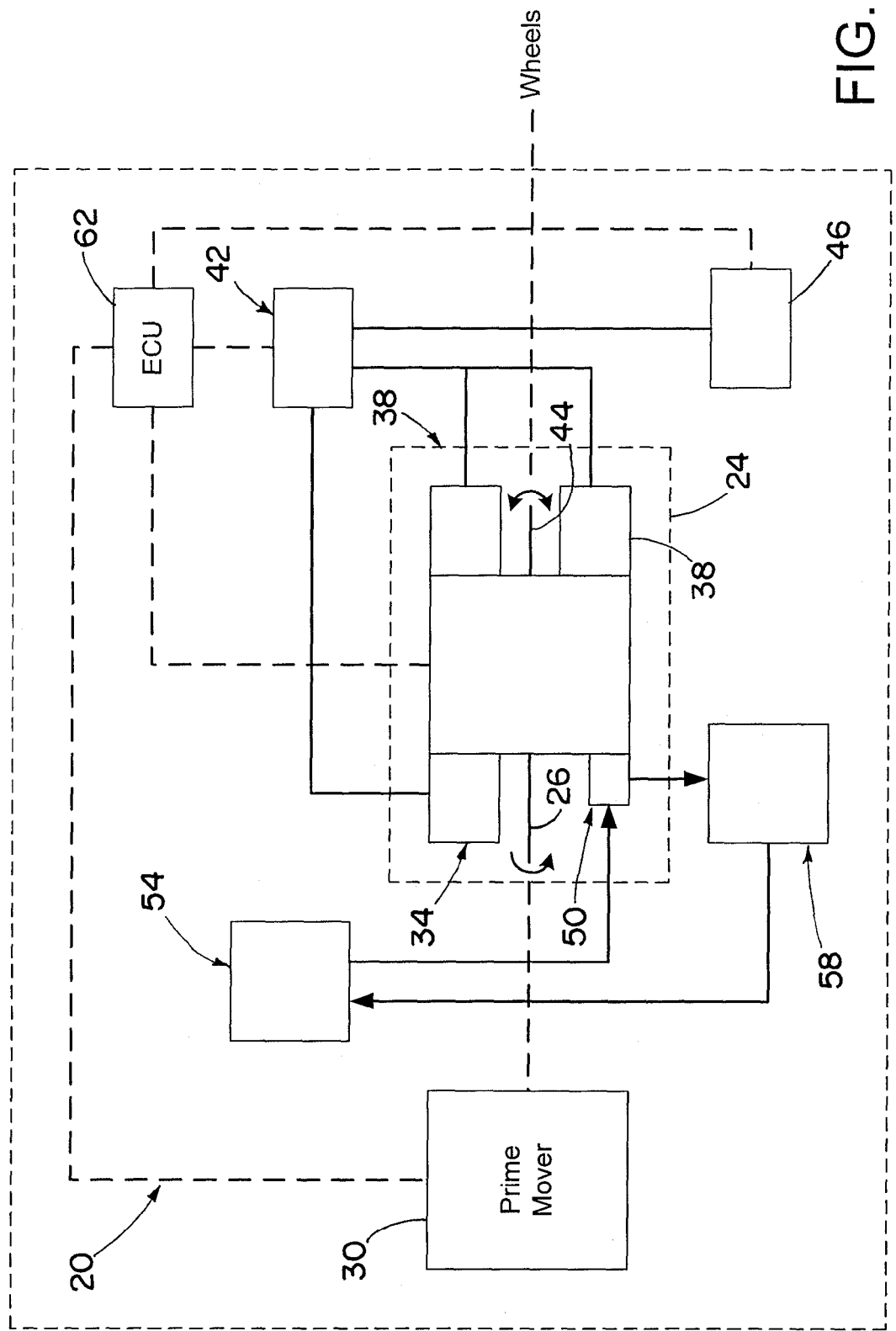
FIG. 1 is a schematic diagram of a hybrid transmission system including an exemplary power drive unit in accordance with the invention.

Turning now to the drawings, and initially to FIG. 1, an exemplary hydraulic hybrid system 20 in accordance with the invention is illustrated schematically. Although the invention will be described in the context of a hydraulic hybrid system, it will be appreciated that aspects of the invention can be applied to a wide range of power transmission devices.

The system 20 generally includes a power drive unit 24 (transmission) having an input 26 for receiving rotational power from a prime mover 30, such as an internal combustion engine (not shown), for example. The power drive unit 24 includes a primary pump/motor 34 fluidly connected to a pair of secondary pump/motors 38 via high pressure manifold 42.

An accumulator 46 for storing pressurized fluid is connected to both the primary and secondary pump/motors 34 and 38 via high pressure manifold 42. As will be described, high pressure manifold 42 serves to supply pressurized fluid to one or more of the primary and secondary pump/motors 34 and 38 and accumulator 46 depending on the mode of operation of the system 20. The system 20 also includes a low pressure fluid cooler and/or charge pump 50 that supplies charge fluid from a low pressure sump or reservoir 54 to the pumps/motors, and circulates fluid to an oil cooler 58.

As will be described in greater detail below, the system 20 includes power transmission elements (e.g., gears, clutches, etc.) for (i) selectively connecting the prime mover 30 to an output shaft 44 for directly driving wheels of a vehicle, (ii) selectively connecting the primary pump/motor 34 to the input shaft 26 for either pumping fluid to the secondary pump/motors 38 and/or accumulator 46, or for providing rotational power to start the prime mover 30, and (iii) selectively connecting the secondary pump/motors 38 to the output shaft for driving wheels of a vehicle and/or, when used in a regenerative braking configuration, for supplying rotational input to the secondary pump/motors 38 for charging the accumulator. All of these various operations are controlled by an electronic control system (ECS) 62 that receives inputs from various sources including operator inputs such as an accelerator pedal, brake pedal, gear select, etc.

With further reference to FIGS. 2-6, the details of the exemplary power drive unit 24 are illustrated. As will be appreciated, the power drive unit 24 includes input shaft 26 for connection to the prime mover, primary pump/motor 34, the pair of secondary pump/motors 38, and lube pump 50. Power transmission elements 68 in the form of shafts, gear, and clutches cooperate to perform the various operations enumerated above.

In particular, the power transmission elements include a clutch C1 for selectively coupling the primary pump/motor 34 to the input shaft 26 via gears Z1 and Z2, clutch C2 for selectively coupling the input shaft 26 to the output shaft 44 for direct drive, and clutch C3 for selectively coupling the secondary pump/motors 38 to the output shaft 44 via gear Z7 and Z4/Z6 (low range) or gears Z7/Z9. With the forgoing in mind, the operation of the transmission 24 will now be described.

Figure 2:
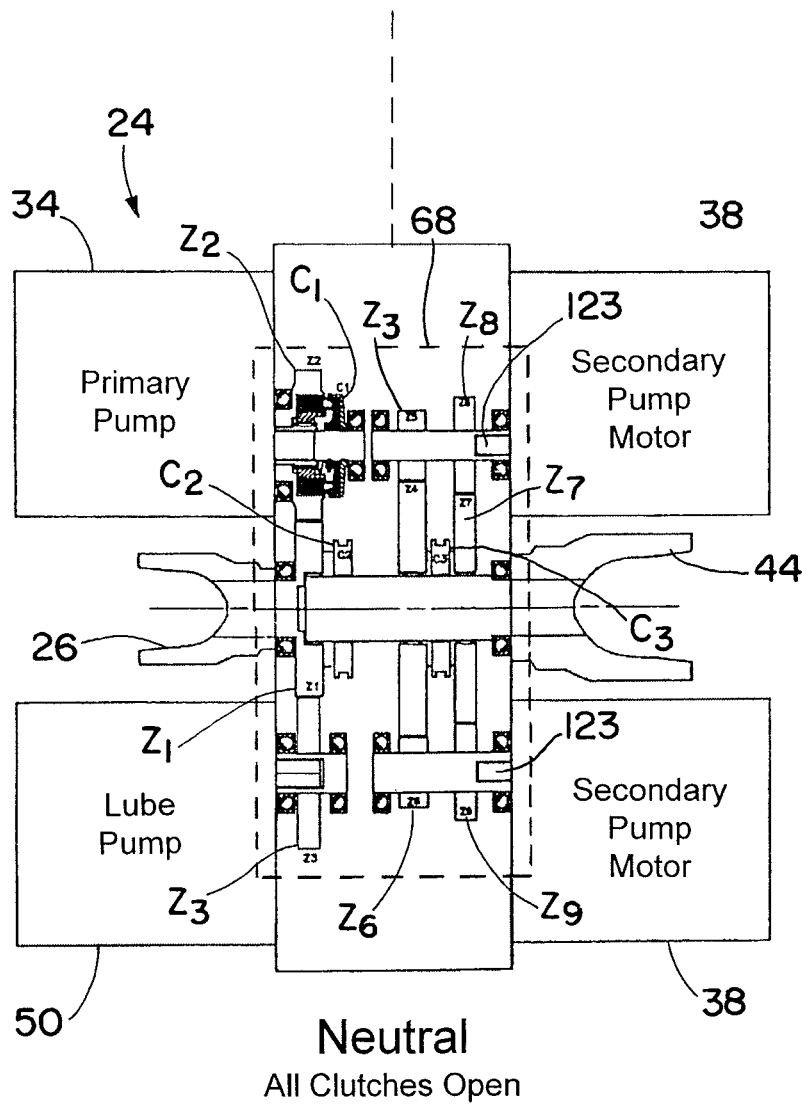
FIG. 2 is a schematic diagram of the exemplary power drive unit in a neutral configuration in accordance with the invention.

In FIG. 2, the transmission 24 is in a neutral state, with clutches C1, C2, and C3 all open (e.g. disengaged). On engine start-up, the ECS 62 commands the primary pump/motor 34 to act as a pump, and the prime mover 30 (also referred to as an engine) is coupled to the primary pump/motor 34. The high pressure manifold 42, which includes integral valves for controlling flow between the primary pump/motor 34, the secondary pump/motors 38, and the accumulator system 46, directs hydraulic fluid from the primary pump/motor 34 to the accumulator system 46 to build up a controlled volume of hydraulic fluid under pressure. The accumulator system 46 may include a single accumulator or a bank of two or more units depending on the total volume of oil needed to be stored in the system. The fluid stored in the accumulator system 46 is also available to supply the secondary pump/motors 38 when acting as motors for use in driving the vehicle, as will be described.

The system 20 has two modes of operation. First, in the city mode or work cycle mode, which accommodates frequent stop and go operation at low speeds, for example less than 40 Mph, the reversible secondary hydraulic pump/motors 38 drive the vehicle through a multiple speed, or single speed, transmission. The unit of FIGS. 2-6, is a two speed unit having two secondary pump/motor units 38, and the transmission shifts from a first gear ratio to a second gear ratio during hydrostatic operation within the city mode, as will be described.

Figure 3:
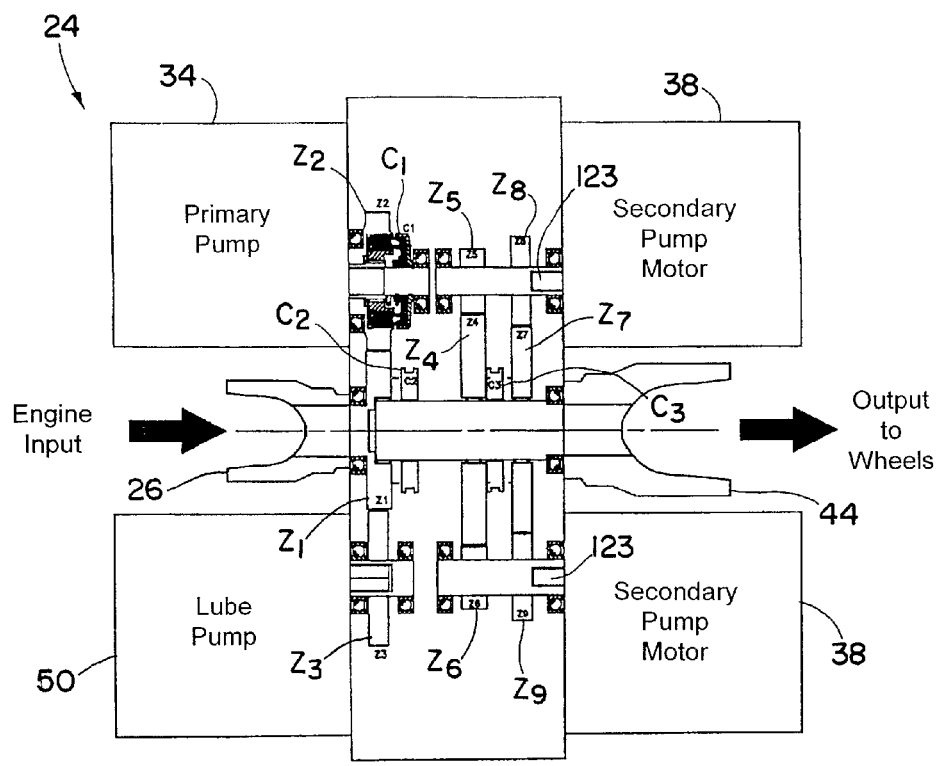
FIG. 3 is a schematic diagram of the exemplary power drive unit in a low-range hydrostatic configuration in accordance with the invention.

In the first mode of operation (city mode), shown in FIG. 3, the position of the vehicle accelerator and brake pedals are detected by sensors and act as input commands to the ECS 62. If the desired action is to accelerate, then the ECS 62 sets the secondary hydraulic drive pump/motors 38 to act as motors and the high pressure manifold 42 directs hydraulic fluid stored under pressure in the accumulator system 46 to drive the secondary pump/motors 38 which are coupled to the output drive shaft 44 through clutch C3.

Figure 4:
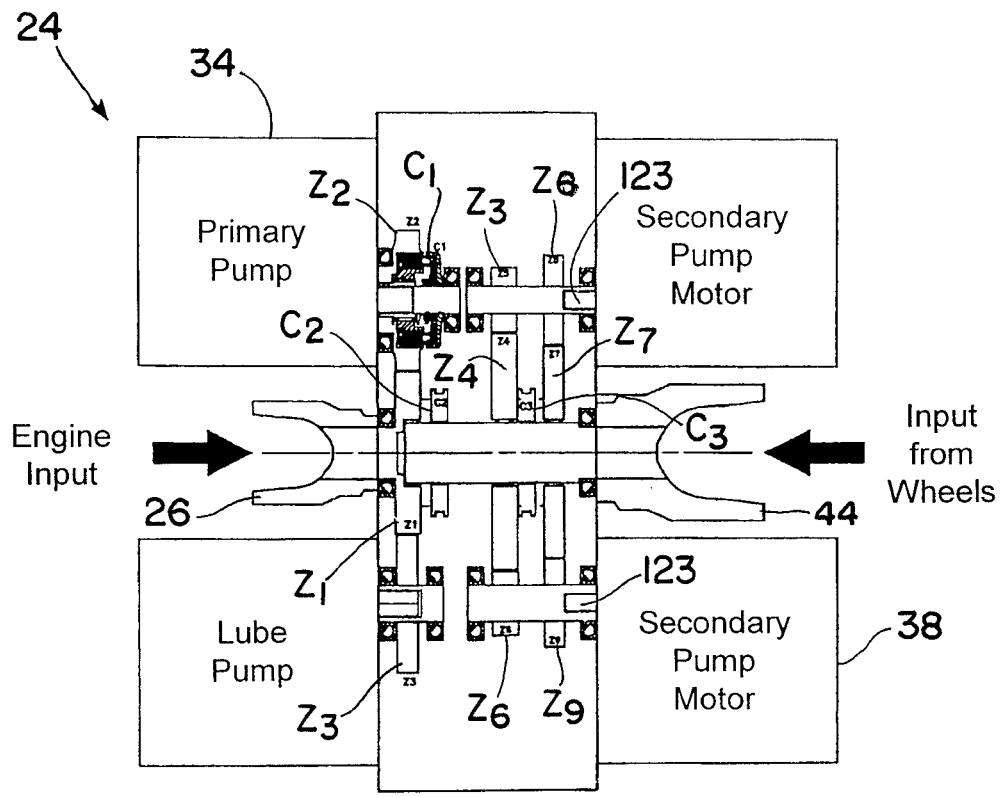
FIG. 4 is a schematic diagram of the exemplary power drive unit in a braking/accumulator charging configuration in accordance with the invention.

If the desired action is to decelerate or brake, then as shown in FIG. 4, the ECS 62 sets the secondary pump/motors 38 to act as pumps and deliver high pressure fluid back through the high pressure manifold 42 into the accumulator system 46. The secondary pump/motors 38, coupled to the output drive shaft 44 by clutch C3 and acting as pumps, generate resistance in the drive train to slow the vehicle down. This action also recovers most of the kinetic energy from the vehicle and stores it for future use by the drive system or for performing other hydraulic powered work related tasks on the vehicle.

In this braking mode, mechanical brakes of the vehicle are not normally needed to decelerate the vehicle, but they are available for use if the braking force required (such as in an emergency stop) is greater than that which is being generated by the secondary pump/motors 38 acting as pumps or as a back-up in case of a failure in the hydraulic drive system 20.

If the pressure level or other sensor input indicates that the accumulator system 46 is fully charged, then the ECS 62 can disengage clutch C1 thereby decoupling the engine from the primary pump/motor 34, and shut the engine off to conserve fuel until additional power is needed.

The stored fluid in the accumulator system 46 can then be used for stop and go operation in the city mode with the engine off until the accumulator system 46 signals the ECS 62 that it is getting low on its fluid charge and needs to be refilled. At this point, the ECS 62 sets the primary pump/motor 34 to reverse and act as a motor, and couples the primary pump/motor 34 and engine 30 by engaging clutch C1. The ECS 62 then directs the high pressure manifold 42 to send high pressure fluid from the accumulator system 46 to the primary pump/motor 34 and, with the clutch C1 engaged, the primary pump/motor 34 is used to restart the engine 30. Once the engine 30 is started, the primary pump/motor 34 is again reversed to act as a pump driven by the engine and directs high pressure fluid back through the high pressure manifold 42 into the accumulator system 46 for replenishment. This sequence can repeat continuously during city mode resulting in significant savings in fuel consumption by the engine 30.

Figure 5:
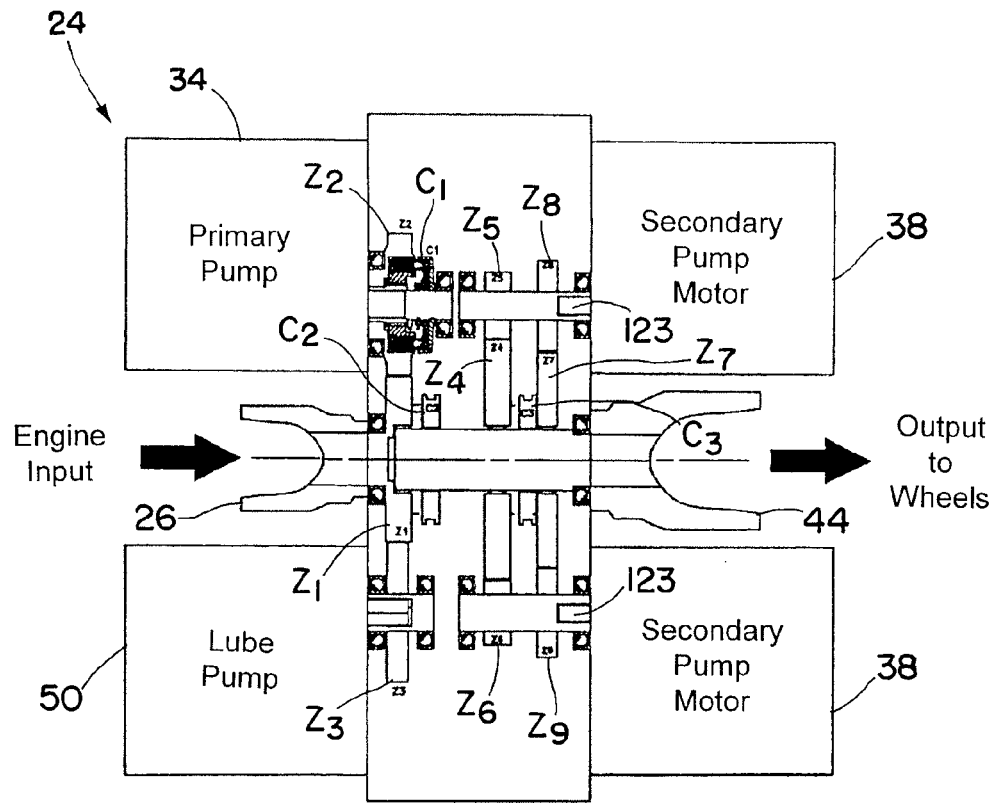
FIG. 5 is a schematic diagram of the exemplary power drive unit in a high-range hydrostatic configuration in accordance with the invention.

In the illustrated embodiment, the city mode uses a two speed mechanical gear ratio set driven by the secondary pump/motors 38 so that these motors can be operated within their most efficient speed ranges. A low range city mode configuration is illustrated in FIG. 3, while a high range city mode configuration is illustrated in FIG. 5. As an example, the low range may provide vehicle speeds from 0 to about 25

Mph, and the second gear, or high range, may provide vehicle speeds from about 25 to 40 Mph. The selection of the preferred shifting point can be set by ECS software or can be manually selected by the operator depending upon desired duty cycle and operating conditions. These shift points do not have to be speed related but can be modified or controlled by other sensor inputs such as vehicle incline angle, gross loaded weight, ambient temperature, hydraulic fluid temperature, or other performance influencing factors, for example.

Figure 6:
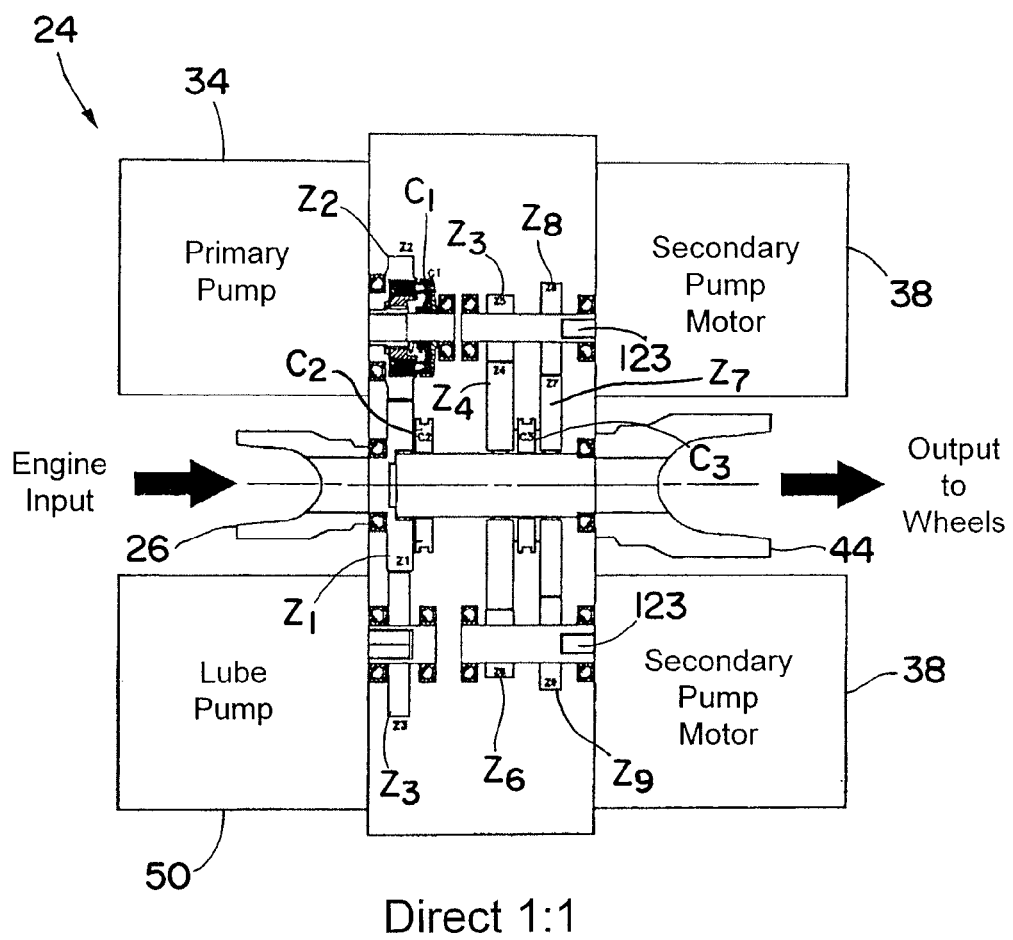
FIG. 6 is a schematic diagram of the exemplary power drive unit in a direct drive configuration in accordance with the invention.

Once the vehicle has accelerated past the top speed of the city mode setting, for example about 40 MPH, the ECS 62 commands the transmission to shift into highway mode utilizing engine 30 to directly drive the output drive shaft 44 by engaging clutch C2 engaged as shown in FIG. 6.

In this mode, the engine 30 will be running within its most efficient speed range and best fuel economy. The primary and secondary pump/motors 34 and 38 are disengaged from the drive train by clutch C3 set in neutral to further maximize overall vehicle efficiency.

Since both gear sets of the two secondary pump motors 38 are in constant mesh, and shifting is accomplished by the secondary clutch C3 capable of selecting "neutral" for idle and direct drive, hydro low (gear Z4 engaged) or hydro high (gear Z7 engaged), it is possible to control the torque output and/or speed of the secondary pump/motors 38 for synchronization to achieve a smooth shift either up or down. This can be accomplished by using the stored hydraulic fluid from the accumulator system 46 independent of the primary pump/motor 34 speed or displacement.

To achieve quick and smooth engagement and disengagement, and in accordance with the present invention, speed or torque dither is introduced to one or more of the secondary hydraulic pump/motors 38 output shaft to avoid possible issues such as gear tooth butting. The speed or torque dither results in dither to the appropriate transmission gears and enables a quick and smooth engagement or disengagement of the high and low gears Z4 and Z7 by clutch C3.

Figure 7:
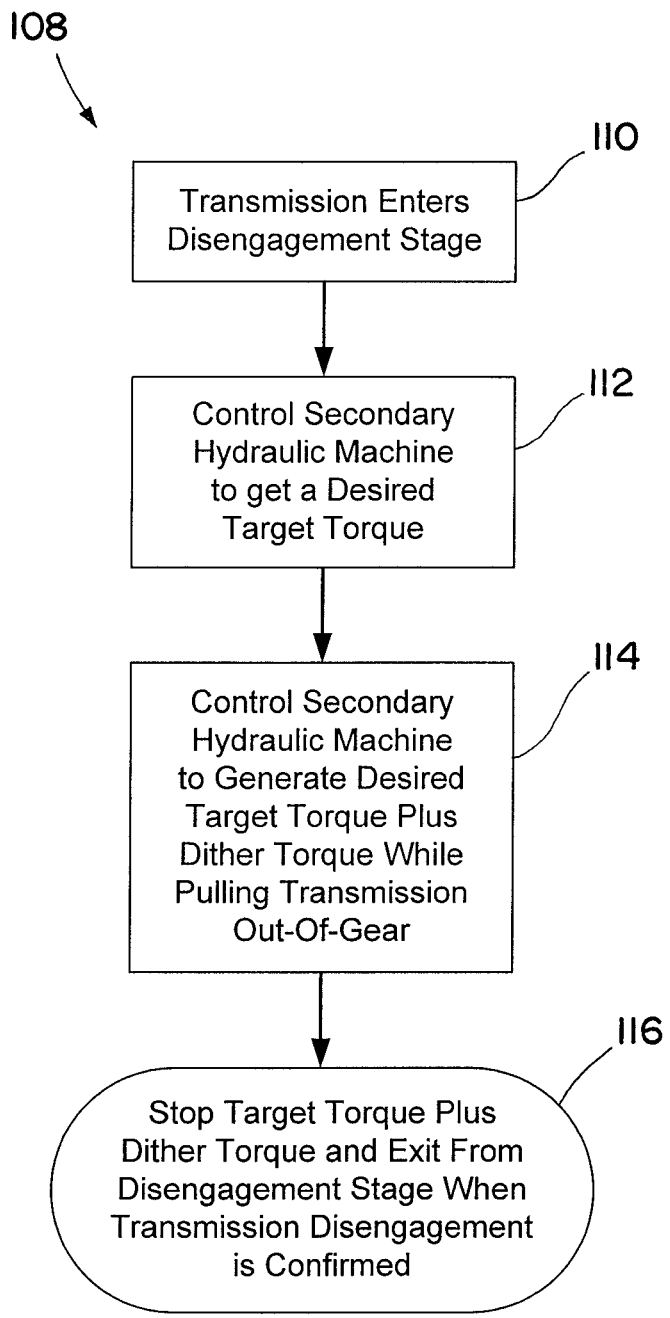
FIG. 7 is a flowchart illustrating an exemplary method of torque dithering in accordance with the invention.

In FIG. 7, an exemplary method 108 for transmission disengagement with torque dither of the secondary hydraulic pump/motors 38 is illustrated. The method begins at step 110 when the transmission enters disengagement stage, generally initiated automatically by the ECU 62 based on a preprogrammed shift point, or upon request by the vehicle operator. In process step 112, the ECU 62 controls the secondary hydraulic pump/motors 38 to get a desired target torque. The desired torque can be determined, for example, by test results and/or estimations including measuring pump drag torques at different speeds and temperatures. For example, at the beginning of transmission disengagement stage, secondary pump/motor 38 output torque is ramped down to a desired target value. In process step 114, the desired torque value, plus a dither torque value, is achieved while pulling the transmission out of gear (e.g., clutch C3 disengaged). The torque dither typically will be determined by test results, and can be a preset value programmed into the ECU. By way of example, the secondary hydraulic pump/motor 38 output torque is controlled to achieve the desired target value plus a desired dither torque while pulling transmission out of gear (e.g., disengaging clutch C3). The desired dither torque is an alternating small positive and negative torque around 0 to eliminate mechanical friction to relieve gear torque lock. In process step 116, the ECU 62 stops controlling the secondary pump/motors 38 and exits from disengagement stage when transmission disengagement is confirmed.

Accordingly, it will be appreciated that torque dither of the secondary hydraulic pump/motors 38 is achieved by utilizing the pressurized fluid stored within the accumulator, rather than fluid supplied from the primary pump/motor 34. Thus, the primary pump/motor 34, and by extension the prime mover 30, need not be in operation during torque dithering.

Figure 8:
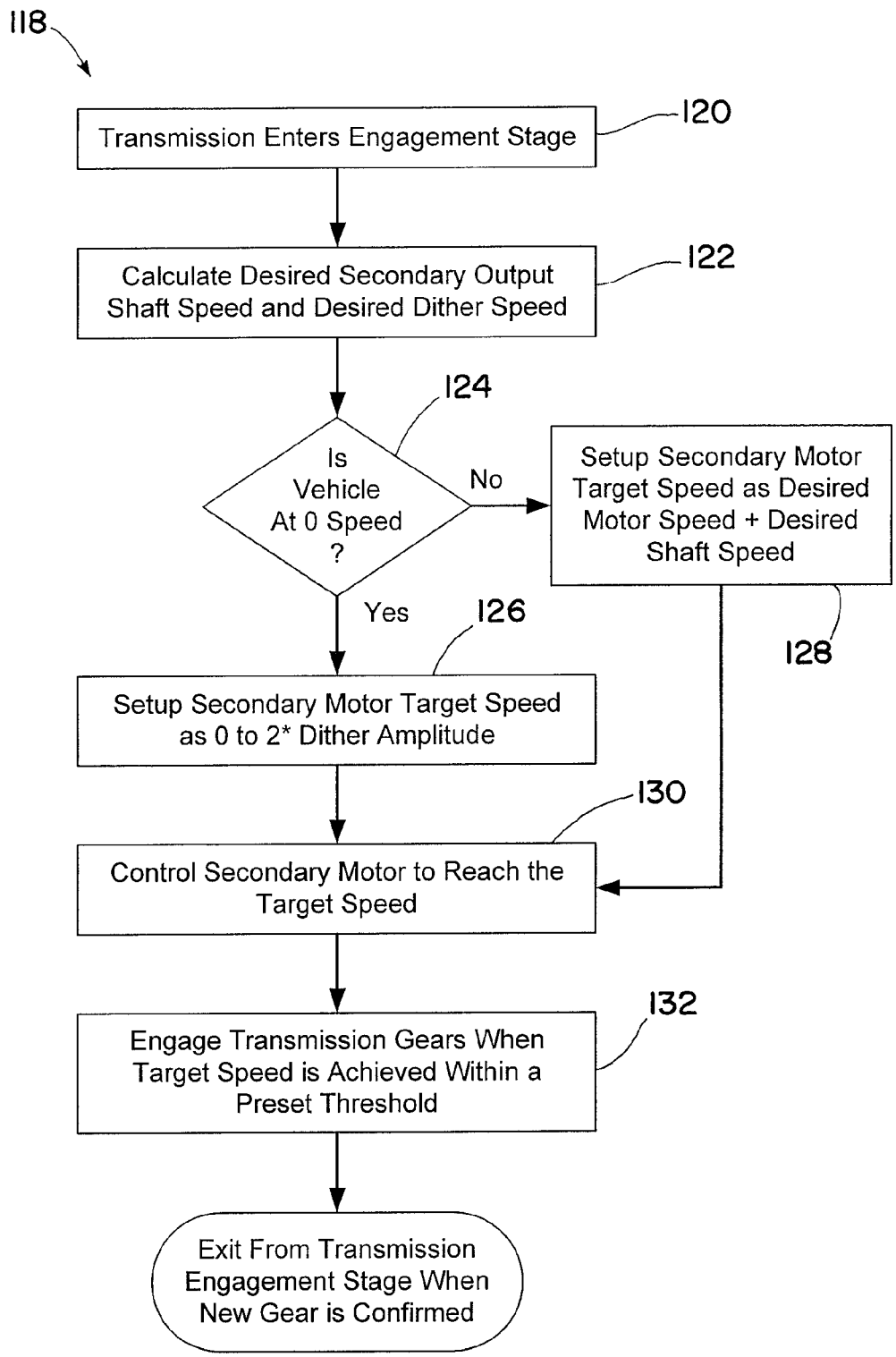
FIG. 8 is a flowchart illustrating an exemplary method of speed dithering in accordance with the invention.

With reference to FIG. 8, an exemplary speed dither method 118 is illustrated. Like the torque dithering method 108 described above, the speed dithering is achieved by utilizing the pressurized fluid stored within the accumulator to ensure smooth engagement of the gears. In process step 120, the transmission enters the engagement stage. As will be appreciated, the engagement stage may immediately follow the disengagement of either the low gear Z4 or the high gear Z7 depending on whether the transmission is upshifting or downshifting, for example. In process step 122, a target speed setting of the secondary pump/motors 38 output shaft 123 (see FIGS. 2-6) is calculated depending on transmission output shaft 44 speed and desired gear ratio. In process step 124, the determination of whether the vehicle is stationary is made. If stationary, the method continues to process step 126 and the target speed is set to zero to two times the dither amplitude. Dither amplitude may generally be determined by testing. For example, the dither amplitude is normally low, and so is the dither frequency. Thus, for vehicle starting from 0 speed, the dither should be set from 0 to 2 times the dither amplitude to make the target speed in the right direction.

If the vehicle is not stationary, the method continues to process step 128, whereat the target speed for the secondary pump/motor 38 output speed is set to the desired secondary pump/motor 38 output shaft 123 speed plus a desired dither speed. The desired dither speed is generally determined from test results, and is preset in the ECU 62. The secondary pump/motors 38 are then controlled at the target speed in process step 130, and the transmission gears are engaged when the target speed is achieved in process step 132 thereby achieving a smooth shift. It will be appreciated that with this technique the secondary hydraulic pump/motor 38 is used to generate speed dither for transmission synchronization and engagement.

While suitable valving could be used to perform both the torque and speed dithering of the secondary pump/motors 38, one type of pump/motor that is particularly well suited for such operations is a variable flow over-center piston pump, such as the pump described in U.S. Pat. No. 4,991,492, which is hereby incorporated herein by reference in its entirety. Such pump/motor design is capable of rapidly changing its operations, and thus can quickly implement the torque and/or speed dithering functions during engagement/disengagement.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of engaging a transmission of a series hydraulic hybrid system having an input shaft for receiving power from a prime mover, an output drive shaft, at least one primary hydraulic pump/motor, and at least one secondary hydraulic pump/motor connected to the primary hydraulic pump/motor via a high pressure manifold and selectively connectable to the output drive shaft of the transmission, the method comprising the steps of:
   calculating a desired speed of the output shaft of the at least one secondary pump/motor via an electronic control;
   operating the at least one secondary pump/motor at a target speed via the electronic control, the target speed being the desired output shaft speed plus a desired speed dither provided by the electronic control; and
   engaging the output shaft of the at least one secondary pump/motor with the output drive shaft of the transmission via power transmission components when the target speed is reached within a prescribed speed error threshold;
   wherein the operating includes regulating the flow of fluid to and from an accumulator that stores pressurized fluid to the at least one secondary pump/motor to achieve the target speed.

2. A method as set forth in claim 1, wherein the engaging the transmission includes engaging a gear associated with the output shaft of the motor with a gear associated with the output drive shaft of the transmission.

3. A method as set forth in claim 1, further comprising the step of selecting a gear from a plurality of different ratio gears associated with the output shaft of the pump/motor, and the engaging includes engaging the selected gear with a gear associated with the output drive shaft of the transmission.

4. A method as set forth in claim 1, further comprising the step of selecting a gear ratio corresponding to a first gear set of a plurality of gear sets having different ratios associated with the output shaft of the pump/motor, and the engaging includes engaging a clutch associated with the output drive shaft of the transmission to thereby engage the output shaft of the pump/motor with the output drive shaft of the transmission with the selected gear ratio.

5. A method as set forth in claim 1, further comprising disengaging the output shaft of the pump/motor from the output drive shaft of the transmission, the disengaging including:
   calculating a desired torque of the output shaft of the at least one pump/motor;
   operating the at least one pump/motor at a target torque that is the desired torque plus a desired torque dither; and
   disengaging the output shaft of the at least one pump/motor with the output shaft of the transmission when the target torque is commanded;
   wherein the operating includes regulating the flow of fluid to and from an accumulator to the pump/motor to achieve the target torque.

6. A method of disengaging a transmission of a series hydraulic hybrid system having an input shaft for receiving power from a prime mover, an output drive shaft, at least one primary hydraulic pump/motor, and at least one secondary hydraulic pump/motor connected to the primary hydraulic pump/motor via a high pressure manifold and selectively connectable to the output drive shaft of the transmission, the method comprising the steps of:
   entering a disengagement stage;
   calculating a desired torque of the output shaft of the at least one secondary pump/motor via a controller,
   operating the at least one secondary pump/motor at a target torque that is the desired torque plus a desired torque dither;
   disengaging the output shaft of the at least one secondary pump/motor with the output drive shaft of the transmission via power transmission components when the target torque is commanded;
   wherein the operating includes regulating a flow of fluid to and from an accumulator that stores pressurized fluid to the at least one secondary pump/motor to achieve the target torque, and
   wherein after disengagement of the output shaft of the pump/motor and the output drive shaft is confirmed, the controller exits from the disengagement stage.

7. A method as set forth in claim 6, wherein the disengaging the output shaft of the pump/motor from the output drive shaft includes disengaging a gear associated with the output shaft of the motor with the output drive shaft of the transmission.

8. A hybrid system for a vehicle comprising:
   a power drive unit having:
      an input shaft for receiving power from a prime mover;
      an output drive shaft;
      a primary hydraulic pump/motor having an output shaft;
      a secondary hydraulic pump/motor connected to the primary hydraulic pump/motor via a high pressure manifold and having an output shaft; and
      power transmission components for selectively coupling the input shaft to at least one of the primary hydraulic pump/motor and the output drive shaft and for selectively coupling the secondary hydraulic pump/motor to the output drive shaft;
   an accumulator for storing pressurized fluid connected to both the primary and secondary pump/motors via the high pressure manifold; and
   a controller calculating a desired speed of the output shaft of the secondary pump/motor, operating the secondary pump/motor at a target speed that is the desired speed plus a desired speed dither, and engaging the output shaft of the secondary pump/motor with the output drive shaft unit when the target speed is reached within a prescribed speed error threshold;
   wherein the controller controls the high pressure manifold to supply fluid from the accumulator to the secondary pump/motor for operating the secondary pump/motor at the target speed.

9. A hybrid system as set forth in claim 8, wherein the power transmission components include a plurality of gear sets associated with the output shaft of the secondary pump/motor, each of the gear sets having a different gear ratio and being separately couplable to the output drive shaft of the power drive unit via a clutch.

10. A hybrid system as set forth in claim 9, wherein the clutch is operable to either engage a gear set of the plurality of gear sets to couple the output shaft of the pump/motor with the output drive shaft of the power drive unit, or to disengage the output shaft of the pump/motor from the output drive shaft.

11. A vehicle comprising a prime mover and the hybrid system as set forth in claim 8, wherein the prime mover is coupled to the input shaft of the power drive unit.

12. A vehicle as set forth in claim 11, further comprising at least one drive element coupled to the output drive shaft of the power drive unit for propelling the vehicle.

13. A vehicle as set forth in claim 12, wherein the at least one drive element includes a wheel.

14. A hybrid system for a vehicle comprising:
a power drive unit having:
- an input shaft for receiving power from a prime mover;
- an output drive shaft;
- a primary hydraulic pump/motor having an output shaft;
- a secondary hydraulic pump/motor connected to the primary hydraulic pump/motor via a high pressure manifold and having an output shaft; and
- power transmission components for selectively coupling the input shaft to at least one of the primary hydraulic pump/motor and the output drive shaft and for selectively coupling the secondary hydraulic pump/motor to the output drive shaft;

an accumulator for storing pressurized fluid connected to both the primary and secondary pump/motors via the high pressure manifold; and a controller calculating a desired torque of the output shaft of the secondary pump/motor, operating the secondary pump/motor at a target torque that is the desired torque plus a desired torque dither, and disengaging the output shaft of the secondary pump/motor from the output drive shaft of the transmission when the target torque is commanded;

wherein the controller regulates the high pressure manifold to supply fluid to and from an accumulator to the pump/motor to achieve the target torque.

15. A hybrid system as set forth in claim 14, wherein the power transmission components include a plurality of gear sets associated with the output shaft of the secondary pump/motor, each of the gear sets having a different gear ratio and being separately couplable to the output drive shaft of the power drive unit via a clutch.

16. A hybrid transmission as set forth in claim 15, wherein the clutch is operable to either engage a gear set of the plurality of gear sets to couple the output shaft of the pump/motor with the output drive shaft of the power drive unit, or to disengage the output shaft of the pump motor from the output drive shaft.

17. A vehicle comprising a prime mover and the hybrid system as set forth in claim 14, wherein the prime mover is coupled to the input shaft of the power drive unit.

18. A vehicle as set forth in claim 17, further comprising at least one drive element coupled to the output drive shaft of the power drive unit for propelling the vehicle.

19. A hybrid system as set forth in claim 8, wherein the controller is configured to calculate a desired torque of the output shaft of the secondary pump/motor, operate the secondary pump/motor at a target torque that is the desired torque plus a desired torque dither, and disengage the output shaft of the secondary pump/motor from the output drive shaft of the power drive unit when the target torque is commanded.

20. A hybrid system as set forth in claim 19, wherein the controller regulates the high pressure manifold to supply fluid to and from an accumulator to the pump/motor to achieve the target torque.

* * * * *